United States Patent [19]

Bobeck et al.

[11] 3,778,788

[45] Dec. 11, 1973

[54] SINGLE WALL DOMAIN PROPAGATION ARRANGEMENT

[75] Inventors: Andrew Henry Bobeck, Chatham; John Alexander Copeland, III, Gillette; Raymond Wolfe, New Providence, all of N.J.

[73] Assignee: Bell Telephone Laboratories, Incorporated, Murray Hill, Berkeley Heights, N.J.

[22] Filed: Nov. 24, 1972

[21] Appl. No.: 309,056

[52] U.S. Cl.340/174 TF, 340/174 EB, 340/174 PM, 340/174 SC, 340/174 VA

[51] Int. Cl. .......... G11c 11/14

[58] Field of Search .......... 340/174 TF

[56] References Cited

OTHER PUBLICATIONS

IBM Technical Disclosure Bulletin Vol. 13 No. 11 Apr. 1971 pg. 3307–3308.

*Primary Examiner*—James W. Moffitt
*Attorney*—W. L. Keefauver et al.

[57] ABSTRACT

Domain propagation along a path defined by a straight line conductor is achieved by driving domains back and forth across the conductor against the edges of regions forbidden to the domains. By angling the edges of the regions with respect to the axis of the conductor and by offsetting those edges associated with one edge of the conductor with respect to those associated with the other, the back and forth motion is translated into movement along the axis.

6 Claims, 9 Drawing Figures

SINGLE WALL DOMAIN PROPAGATION ARRANGEMENT

FIELD OF THE INVENTION

This invention relates to information storage apparatus of the type in which information is represented as magnetic single wall domains commonly referred to as magnetic bubbles.

BACKGROUND OF THE INVENTION

A variety of arrangements for moving magnetic bubbles controllably in a layer of a suitable magnetic material has been described in the literature. One type of bubble propagating arrangement comprises a plurality of electrically conducting loops in which electric currents are impressed in sequence for generating consecutively offset field gradients for moving a domain. This type of circuit is referred to as a "current access" arrangement.

Another type of bubble propagation arrangement is referred to as a "field access" arrangement. In arrangements of this type, a pattern of magnetic elements is formed in a layer adjacent a layer of material in which bubbles can be moved. The elements respond to a magnetic field reorienting in the plane of the domain layer to generate field gradients which move a domain along a path defined by the pattern of the elements and the orientation sequence of the "in-plane" field.

Arrangements of the conductor-access type require conductors with thicknesses sufficient to carry the requisite currents. Due to present fabrication constraints, conductor thickness requirements necessitate circuits significantly larger than can be obtained with field access approaches. But in the field access arrangements, the coupling (efficiency) between the bubbles and the in-plane field is relatively low because of the relatively large volume over which the drive field is operative.

One approach to making smaller conductor access arrangements is to simplify the geometry of the conductor (viz: eliminating the conductor loops). Serpentine conductors interleaved with one another to define a path for domain movement represent one attempt in this direction. But the ultimate would be a straight line conductor. On the other hand, a straight line conductor would not serve to advance a bubble along the axis of the conductor. It would merely operate to shuttle a bubble from one side of the conductor to another.

Copending application Ser. No. 119,492 filed Mar. 1, 1971 and now U.S. Pat. No. 3,702,994, for D. E. Kish and J. L. Smith describes a conductor access arrangement employing straight line conductors to switch flux in a pattern of magnetically soft (permalloy) elements in a layer adjacent the layer in which the domains move. The magnetic elements produce the requisite gradients for domain movement along the conductor axis. The coupling between the drive field and the bubbles in this case is via the permalloy elements. Consequently, losses do not occur and an additional inductive load is present. In addition, the permalloy switching time can be limiting with respect to high frequency operation.

BRIEF DESCRIPTION OF THE INVENTION

The present invention is directed at a conductor access bubble arrangement in which bubbles are shuttled back and forth across a straight line conductor. A pattern of regions in which bubbles do not exist during normal operation is defined in the layer of domain movement along the axis of the conductor. The regions are defined so that each time a bubble is moved to one side of the conductor in response to a current pulse in the conductor, it is deflected, by the edge of a forbidden region, in a direction determined by the orientation of that edge. By offsetting the edges of the forbidden regions associated with opposite edges of the conductor, bubbles are moved in a selected direction along the axis of the conductor in response to alternating current pulses in the conductor.

In one embodiment, the forbidden regions are formed by heating the domain layer in the presence of two saw-tooth patterns of silicon each with a set of teeth aligned with an edge of the driving conductor.

DETAILED DESCRIPTION

Figure 1:
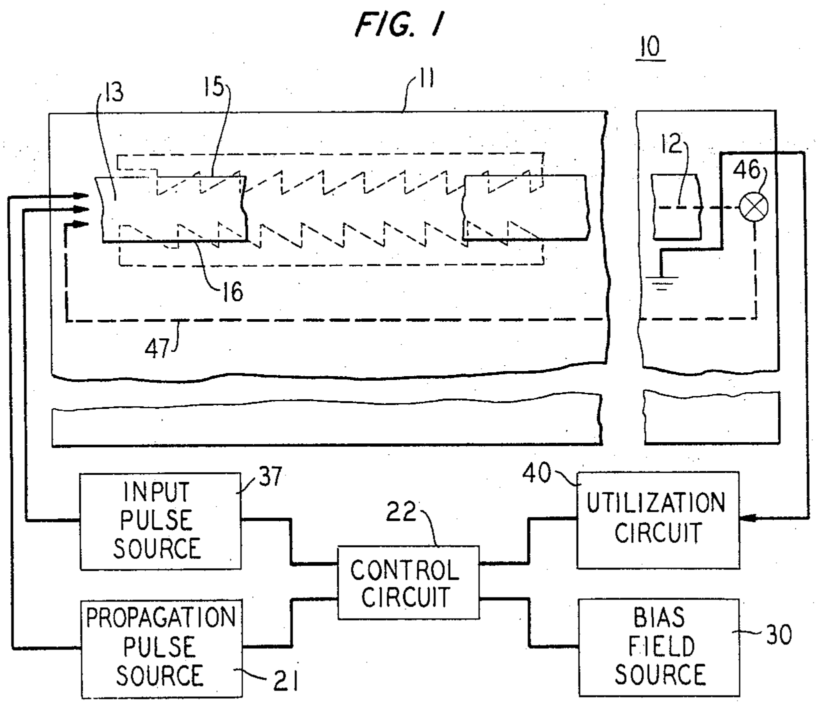
FIG. 1 is a schematic representation of a bubble propagation arrangement in accordance with this invention.

FIG. 1 shows a conductor access, bubble propagation arrangement 10 in accordance with this invention. The arrangement comprises a layer 11 of the material in which magnetic bubbles can be moved.

A representative domain propagation channel is designated 12 in FIG. 1. The channel is defined by an electrical conductor 13 formed by familiar photolithographic techniques adjacent a surface of layer 11. Conductor 13 has top and bottom edges 15 and 16 as viewed in the figure.

Regions 17 and 18 are defined in layer 11 beneath edges 15 and 16, respectively in a manner to be described hereinafter. Each region can be seen in FIG. 2 to be of saw tooth geometry serrated at one edge with the teeth aligned with an edge of conductor 13. The outside edge of the region in each instance can be seen to be straight in the illustrative arrangement. FIG. 3 shows a cross section of the arrangement of FIG. 2 taken along line 2–2'. Note that conductor 13 overlaps more of region 18 than region 17 at '–2' as is clear from FIGS. 2 and 3 due to the offset, along the axis of the channel, in the serrations of the inside edges of the regions.

Movement of a domain along the axis of conductor 13 is from left to right as viewed in the figures in response to current alternations in the conductor. Block 21 of FIG. 1 represents a propagation pulse source for this purpose applying to conductor 13 the pulse form I shown in FIG. 2 under the control of a control circuit represented by block 22 of FIG. 1.

Figure 2:
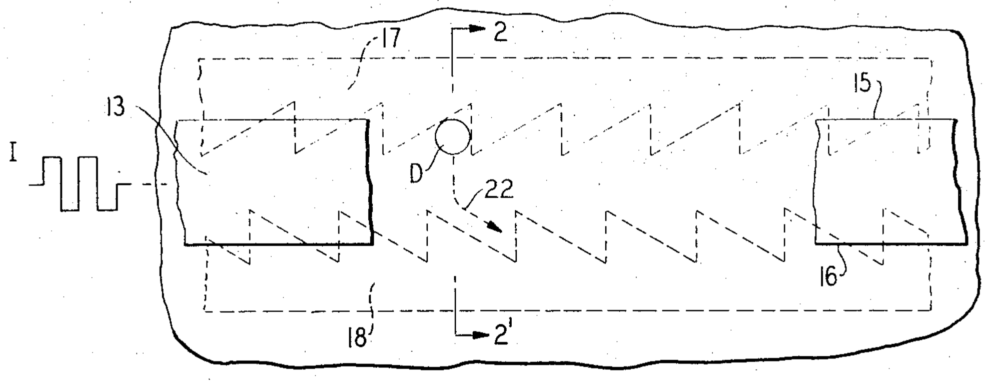
FIGS. 2, 4, 5, and 6 are schematic representations of a portion of the arrangement of FIG. 1 showing the magnetic condition in that portion during operation.
Figure 3:
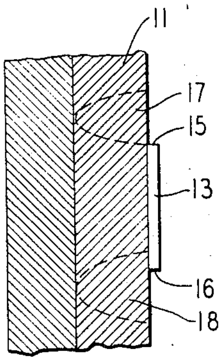
FIG. 3 is a cross-sectional view of the portion of the arrangement of FIG. 1 shown in FIG. 2.

Consider a bubble in the position represented by circle D of FIG. 2. A bubble has its magnetization aligned with an axis normal to the plane of layer 11. We will adopt the convention that the magnetization is directed upward (in a positive direction) out of the plane and the magnetization of the remainder of layer 11 is directed (in a negative direction) downward into the plane. Consequently, for a current flowing from right to left in conductor 13 in FIG. 2, the right-hand rule indicates that the lower edge 16 of conductor 13 becomes attractive to domain D (or positive) and the top edge repulsive (or negative). Domain D responds by moving first downward as viewed and then to the right along the angled edge of region 18 to a "least energy" position along a path indicated by the broken arrow 22 in FIG. 2. The domain ultimately occupies the position shown in FIG. 4.

Figure 4:
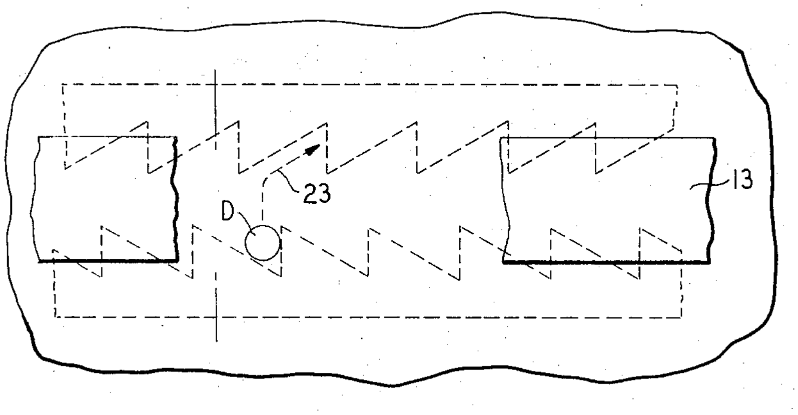
Figure 5:
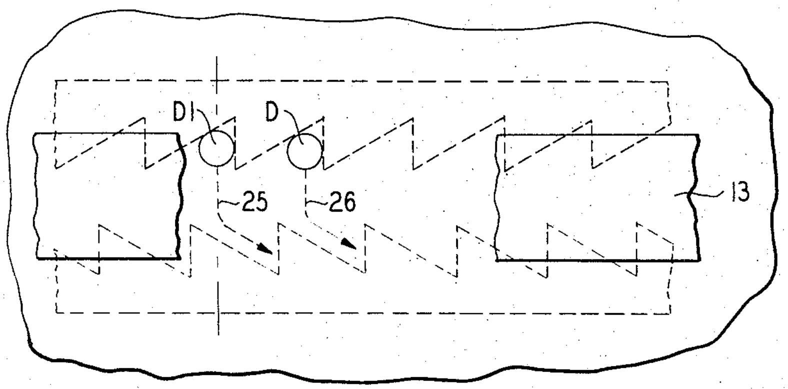

A pulse of the opposite polarity is operative to move domain D upward in a like manner as indicated by broken arrow 23 in FIG. 4 to the position shown for the domain in FIG. 5. Thus, it is seen that one alternation of the current pulse in conductor 13 is operative to advance domain D one period (viz: stage) to the right.

Figure 6:
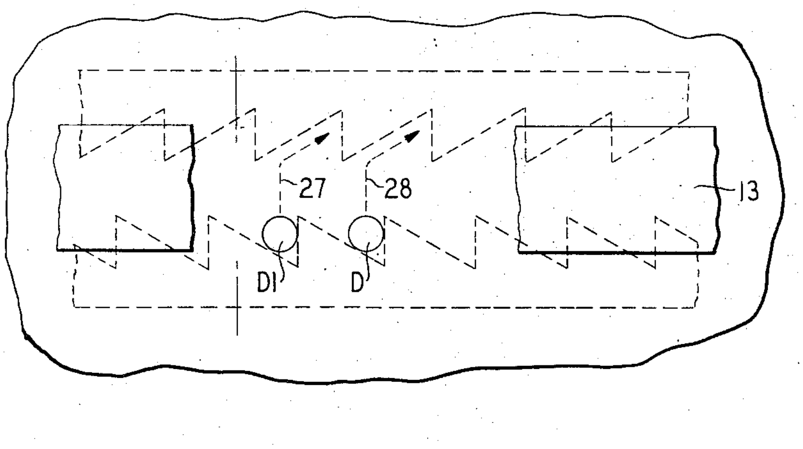

A second domain D1 shown in FIG. 5 moves as does domain D in FIG. 2 in response to the same alternations in current. Such synchronous movement is shown by broken arrows 25 and 26 and 27 and 28 of FIGS. 5 and 6, respectively. Of course, information is represented as the presence (binary one) and absence (binary zero) of a domain in each stage. Therefore, we can imagine circle D1 to represent the position of an absent domain in which case the information 01 is shown to be moved in FIGS. 5 and 6 rather than 11 as indicated previously.

The current alternations in conductor 13 are operative to produce field gradients along an axis perpendicular to the axis of the conductor. In practical arrangements of domain propagation apparatus, a bias field of a (negative) polarity to constrict a domain to an operating diameter is maintained typically by a permanent magnet represented by block 30 of FIG. 1. The field gradients, thus, are superimposed on the bias field and, in reversing, causes a bubble to shuttle back and forth across the conductor with only negligible variation in diameter without advancement along the axis of the conductor.

Advancement of a domain along the axis of the conductor is due to the angled edge of regions 17 and 18 which is operative to deflect domains shuttled by the reversing field gradients. The nature of those edges depends on the properties of regions 17 and 18. These regions have, for example, a lower moment than the remainder of layer 11 and are of sufficient width that bubbles collapse in those regions under normal operating conditions. Moreover, a force due to the change in movement with distance is exerted on a bubble at the boundary between low and high moment regions preventing the entry of bubbles into the low moment region. Consequently, an energy barrier (magnetostatic in nature) exists at the edges of regions 17 and 18 to constrain a domain from moving to the edge of conductor 13 at a position perpendicular to its original position during each current alternation. The domain can reach that low energy position by incremental advancement along the edges of regions 17 and 18 during each alternation of the drive field. The edges, moreover, are positioned at an angle to the axis of movement to make such incremental advancements unidirectional. The offsetting of the serrations is to enable the incremental advancement of a domain shuttled from a rest position during one portion of the drive cycle to be additive to the incremental advancement resulting from the movement of that domain during the next preceding portion of the drive cycle.

There are a variety of techniques for achieving suitable regions 17 and 18. The most attractive technique, at present, is to evaporate silicon on the surface of layer 11 in the pattern of regions 17 and 18 and to heat the resulting structure at a temperature of about 600° Centigrade. Regions 17 and 18 are found to have a moment significantly lower than that of the remainder of layer 11 when formed in this manner.

The mechanism for the lowering of the moment is theorized to lie in the property of silicon to getter oxygen from layer 11 at elevated temperatures. Since the moment of layer 11 is determined by the net effect of the magnetizations of the atoms in, for example, the tetrahedral and the octohedral sites of a single crystal garnet, any variation in the occupancy of these sites modifies the moment. With sites formally occupied by oxygen now becoming vacant at the elevated temperature, the occupancy has been of the tetrahedral and octohedral sites by iron or gallium (iron or aluminum) has been found to change in a manner to produce the desired moment reduction in regions 17 and 18.

Conductor 13 is deposited on layer 11 after the removal of the silicon pattern.

An example of one such structure illustrates the moment changes which are achieved and the resulting device properties. An epitaxial film having a thickness of 6 microns of $Y_{2.6}Sm_{0.4}Fe_{3.9}Ga_{1.1}O_{12}$ was grown on the 111 face of a crystal of nonmagnetic Gadolinium Gallium Garnet. The film exhibited bubble collapse (a measure of moment) at 104 oersteds. A layer of silicon 2000 Angstrom units thick was deposited uniformly on the surface of layer 11 and photolithographically etched in the pattern of regions 17 and 18 as shown in FIG. 2. The resulting structure was heated at about 600° Centigrade for 30 minutes producing a 30-oersted reduction in the bubble collapse value. The operating bubble diameter was 6 microns, maintained at a bias field of 95 oersteds. A gold conductor having a 20-micron width and a thickness of 0.4 micron was positioned on the surface of layer 11 as shown in FIG. 2. The periodicities of the serrations of regions 17 and 18 were 30 microns and 22 microns in two of the test circuits. Bubble patterns were moved as described with ± 50 milliampere current pulses over an operating range of 80–100 oersteds bias. During tests, operation from ± 40 milliamperes to ± 70 milliamperes at data rates up to 300 kHz was achieved.

Figure 7:
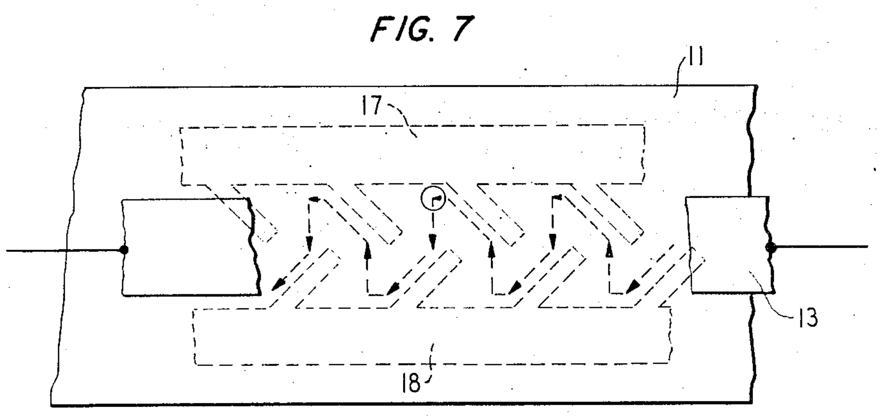
FIG. 7 is a schematic representation of a portion of an arrangement alternative to that shown in FIG. 2.

FIG. 7 shows an alternative structure where the teeth are narrower than in the previous embodiment and the angle the teeth form with the channel axis is opposite to that previosuly shown in FIG. 2. The resulting path of bubble movement from right to left is shown by the broken arrows in FIG. 7. Circuits of this type have been operated at 400 kilohertz data rates with bias field margins of about 10 oersteds.

The foregoing embodiments were made by the techniques described above. But ion implantation, selective etching techniques for providing grooves in the surfaces of layer 11, and exposure to forming gas at an elevated temperature (hydrogen diffusion) through an $Al_2O_3$ mask also are suitable techniques for forming suitable structures.

Figure 8:
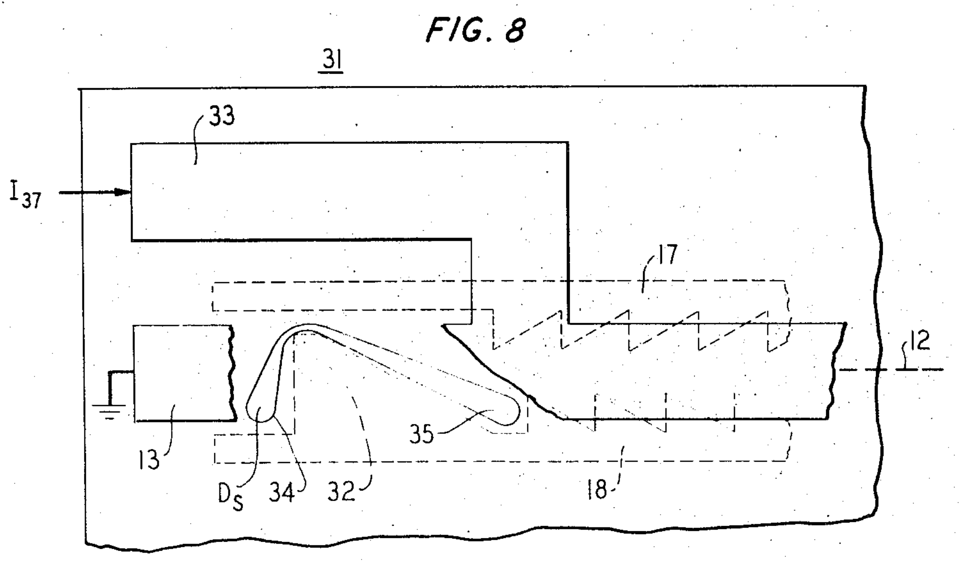
FIGS. 8 and 9 are schematic representations of input and output arrangements suitable for the arrangement of FIG. 1.

FIG. 8 shows an input region 31 for supplying domains for movement along path 12 of FIG. 1. The regions 17 and 18 can be seen to include a portion 32 which forms a U-shaped nondiffused terminus to the left as viewed in FIG. 8. Conductor 13 at the input region also includes a parallel branch 33 to which an input pulse is applied. A seed domain DS at a position 34 moves, upward as viewed, across portion 32 when conductor 13 (and branch 33) is pulsed and expands along the entire upper edge of the U-shaped portion as shown in FIG. 8. A reversal of the pulse in conductor 13 drives the expanded domain downward as viewed. In response, the expanded seed domain is divided into two portions resulting in a domain in each of positions 34 and 35 in FIG. 8. The former constitutes a new seed domain; the latter constitutes a data domain.

Division of a seed domain in this manner utilizes a pulse larger than is necessary for propagation in order to drive a domain across portion 32. The branch conductor 33 of FIG. 8 is operative in response to a pulse from input pulse source 37 of FIG. 1 for this purpose as indicated in FIG. 8 by $I_{37}$.

Figure 9:
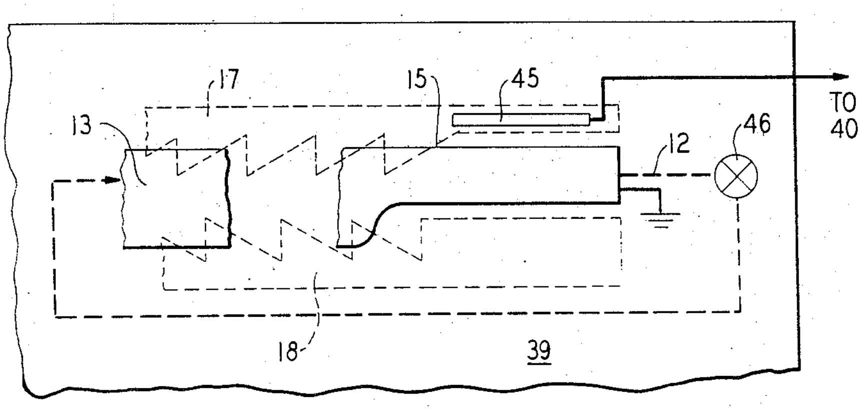

FIG. 9 shows an output area 39 for domains moved along path 12 of FIG. 1 for applying signals to a utilization circuit 40 of FIG. 1. For domain expansion, regions 17 and 18 are shown extended to the right along the edge of conductor 13. The extensions of regions 17 and 18 are narrow and enlarged respectively and include no saw teeth. The extensions define a relatively narrow nondiffused channel astride the top edge 15 of conductor 13. Conductor 13 is narrowed at the channel in order to provide an increased field there when pulsed. When the normal propagation operation moves a domain to position 39 in FIG. 9, the pulse then on conductor 13 is operative to expand the domain because of the absence of the restraining influence of the teeth and because of the increased field. A magnetoresistance element indicated at 45 in FIG. 9 is disposed to couple position 39 for applying the signal to circuit 40 indicative of the presence of a domain.

Domains so detected may be advanced further to the right by a continuation of regions 17 and 18 and of conductor 13. A straight run path, of course, terminates in the familiar domain annihilator indicated by the encircled X sign designated 46 in FIGS. 1 and 9.

On the other hand, path 12 may be of closed loop configuration as indicated by the broken closed loop arrow 47 in FIG. 1. In closed loop arrangement, conductor 13 is formed into a sinusoidal geometry defining a U turn. The legs of the conductor in the turn are aligned with but offset with respect to narrow, low moment, nonserrated regions. The normal propagation pulses on conductor 13 in this instance are operative not only to expand domains in such a turn but also to step expanded domains downward as viewed in a manner to complete a turn. Expanded domains are contracted to normal operating size upon the initiation of movement to the left along path 47 by a reduction in the length of the low moment region aligned with the terminal leg of conductor 13 in the turn.

Also in a closed loop arrangement, input area 31 of FIG. 8 typically is removed from the main (recirculating) channel and the mirror image of the turn geometry is used conveniently to complete the requisite turn for providing the loop closure. The input arrangement is provided along an auxiliary path and is operative essentally as described above.

An expansion turn of the type useful in recirculating channels in accordance with an aspect of this invention is fully disclosed in copending application Ser. No. 308,996 filed on even date herewith for A. H. Bobeck (Case 100).

What has been described is considered merely illustrative of the principles of this invention. Therefore, various embodiments can be devised by those skilled in the art in accordance with those principles within the spirit and scope of the invention as encompassed by the following claims.

What is claimed is:

1. A magnetic arrangement comprising a layer of material in which single wall domains can be moved, an electrical conductor coupled to said layer and being operative when pulsed to shuttle a domain thereacross, and means for defining in said layer regions forbidden to domains, said regions having a geometry along a domain path in said layer for defining boundaries so disposed to convert said shuttling movement into domain advancement along said path.

2. A magnetic arrangement in accordance with claim 1 including first and second of said regions which exhibit magnetic moments lower than the remainder of said layer and having a saw-tooth geometry, the "teeth" of each of said regions being disposed along an edge of said conductor.

3. A magnetic arrangement in accordance with claim 2 in which the teeth of said first and second regions are offset with respect to one another along the axis of said path.

4. A magnetic arrangement in accordance with claim 1 in which each of said teeth has a first boundary and said teeth are arranged in a periodic pattern along each edge of said conductor such that said boundaries extend inwardly at an angle with respect to said edge.

5. A magnetic arrangement comprising a layer of material in which single wall domains can be moved, an electrical conductor coupled to said layer operative to shuttle domains back and forth thereacross along paths transverse to the axis of said conductor in response to alternating current pulses applied thereto, and means for defining in said layer boundaries which obstruct domains moving along said transverse paths, said boundaries having properties and being disposed to inhibit the further movement of domains along said transverse paths and being of a geometry to deflect domains so inhibited along said axis.

6. A magnetic arrangement in accordance with claim 5 wherein said conductor has a straight line geometry.

* * * * *

UNITED STATES PATENT OFFICE

CERTIFICATE OF CORRECTION

Patent No. 3,778,788 Dated December 11, 1973

Inventor(s) Andrew H. Bobeck, John A. Copeland, III, and Raymond Wolfe

It is certified that error appears in the above-identified patent and that said Letters Patent are hereby corrected as shown below:

Column 1, line 58, delete "not".

Column 2, line 53, " '-2' " should be -- 2-2' --.

Column 4, line 53, "previosuly" should be --previously--;

line 62, "faces" should be --face--.

Signed and sealed this 9th day of April 1974.

(SEAL)
Attest:

EDWARD M.FLETCHER,JR.
Attesting Officer

C. MARSHALL DANN
Commissioner of Patents